United States Patent [19]

Kunkle

[11] 4,120,596
[45] Oct. 17, 1978

[54] VALVE-ACTUATOR COUPLING

[75] Inventor: Timothy Edward Kunkle, Pittsburgh, Pa.

[73] Assignee: Rockwell International Corporation, Pittsburgh, Pa.

[21] Appl. No.: 663,786

[22] Filed: Mar. 4, 1976

[51] Int. Cl.² .......................... F16K 41/00; F16B 7/18
[52] U.S. Cl. ....................................... 403/14; 403/342; 251/134; 251/77; 74/424.8 VA; 251/330
[58] Field of Search ............... 251/77, 133, 134, 63.4, 251/330; 403/342, 14; 74/424.8 VA, 470

[56] References Cited

U.S. PATENT DOCUMENTS

| 2,663,318 | 12/1953 | Lakso | 251/77 X |
| 3,024,403 | 3/1962 | Safford | 251/134 X |
| 3,342,451 | 9/1967 | Matousek | 251/77 |
| 3,554,483 | 1/1971 | Kuwik et al. | 251/77 |

FOREIGN PATENT DOCUMENTS

| 52,942 | 1942 | Netherlands | 251/133 |
| 714,187 | 8/1954 | United Kingdom | 251/77 |

Primary Examiner—Arnold Rosenthal

[57] ABSTRACT

A coupling is mounted between a valve stem of a valve and a rod of a valve actuator. A first fitting of the coupling is mounted on an end of the rod and a second fitting is mounted on an adjacent end of the stem. The first fitting includes an opening therein which loosely entraps an expanded portion of the second fitting. The first and second fittings respectively have aligned surfaces which are generally perpendicular to the rod and stem. The surfaces make contact during movement of the rod toward the valve for closure of the valve. A resiliently deflectable spring is disposed between the first and second fittings to limit the amount of force transmitted to the valve through the stem when the rod is in a position for backseating the valve.

1 Claim, 4 Drawing Figures

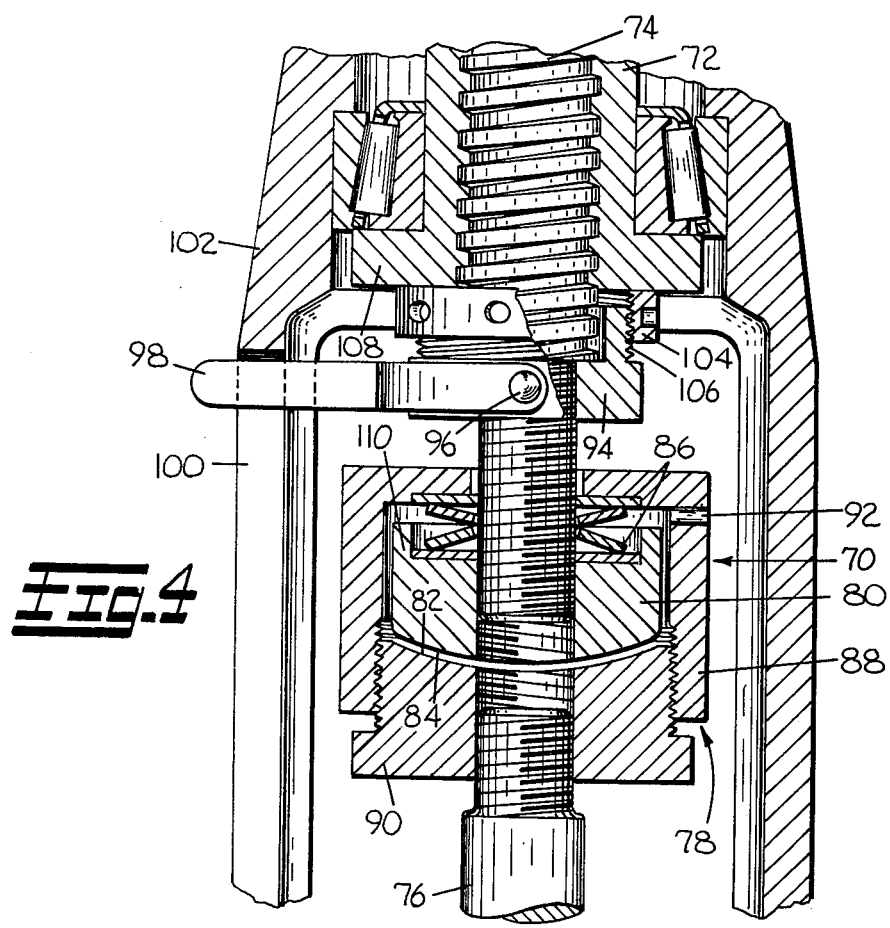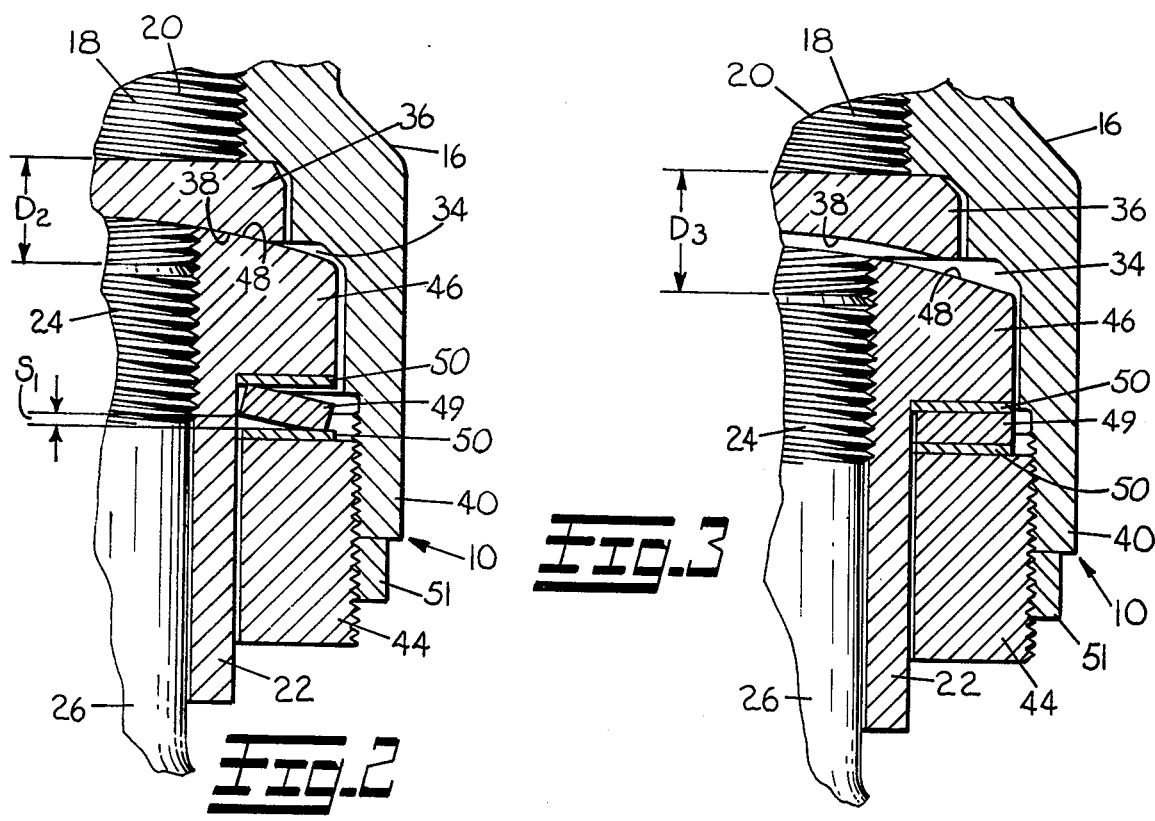

VALVE-ACTUATOR COUPLING

BACKGROUND OF THE INVENTION

1. Field of the Invention

This invention relates to a valve - actuator coupling and, more specifically, to such a coupling which can limit the amount of force applied to the valve during backseating when the rod of the actuator acts on the valve stem to open the valve.

2. Description of the Prior Art

There have heretofore been utilized a number of means for opening and closing large valves in the feedwater and steam systems of nuclear power plants which include a backseating configuration, such as those disclosed in U.S. Pat. Nos. 2,663,318; 3,601,157 and 3,888,280. One such means which is frequently used is a valve actuator which incorporates a hydraulic cylinder and a gas accumulator, such as those disclosed in an application filed on the same date as the present application, entitled "Valve Actuator", by D. W. Duffey. In both the preferred embodiment and the prior art embodiment disclosed therein, hydraulic oil is directed to a piston within the hydraulic cylinder to open the valve in opposition to a precharged source of high pressure gas in an accumulator which gas acts on the other side of the piston. The high pressure gas maintained in the accumulator is of a sufficient quantity and pressure to act on the piston to rapidly close the valve when the hydraulic pressure is relieved. Under normal operating conditions, pressure limiting means, such as a hydraulic accumulator or a relief valve, on the hydraulic system which provides the hydraulic pressure for opening the valve is set at a level to properly backseat the valve when the piston is in an upward position. The resulting force acting on the stem, the difference between the hydraulic force upward and the gas force downward, is maintained to ensure proper backseating without damaging the valve. However, should a leak in or a rupture of the accumulator occur, the force generated by the hydraulic oil would no longer be opposed by the high pressure gas. Were this force to be transmitted to the backseat of the valve through the stem, permanent valve damage might occur. Although it is less likely to occur, the same detrimental results might be obtained with failure of the hydraulic pressure limiting means.

A concern for and a consideration of the amount of force applied to a valve during backseating has also affected the operation of other forms of valve actuators. Although they are not capable of closing this type of large valve as rapidly as can the accumulator described hereinabove, electric motor operators are frequently employed for valve operation in nuclear power plant systems. To close a valve with an electrical motor operator, a remote signal is sent to the motor to cause gear rotation in one direction to lower the rod. The motor gearing includes a torque limit switch which is contacted during a predetermined torque condition within the gearing so that when the rod has acted on the stem to fully seat the valve, motor power is discontinued by the torque limit switch. Motor operation is, therefore, automatically stopped when the valve is fully closed. It would seem that a similar torque limit switch could be employed in the motor gearing when the valve is opened. The motor would again stop when the valve is backseated as an increase in torque would again turn off the electrical motor. However, the level at which such a torque limit switch would be set to prevent damage during backseating would limit the torque throughout operation of the electrical motor operator while opening the valve. But it is often found that a significantly higher torque is needed simply to initially open the valve. A torque limit switch with such a setting would, therefore, prevent the valve from being opened by disconnecting the motor prior to any upward movement of the stem. Consequently, it is presently the practice in the operation of the electrical motor operator during opening of the valve to provide a position limit switch for stopping the motor just prior to backseating of the valve. A handwheel is provided for manually applying the proper torque to fully backseat the valve.

Last, but by no means least, there exists valve actuators which are operated by hydraulic oil which acts on both sides of a piston to position the valve. The use of hydraulic oil pressure to open the valve, without a controlled pressure on the other side of the piston in opposition thereto, has generally produced forces which are unsatisfactory for backseating the valve. Consequently, valves operated by a hydraulic actuator have not heretofore been provided with any simple, automatic means for backseating. A means for limiting the force which could be applied to the valve through the valve stem would, therefore, allow a simple backseating feature to be employed for the first time with this type of actuator.

SUMMARY OF THE INVENTION

It is, therefore, an object of the invention to provide a means for applying an adequate but limited force to a valve stem with a valve actuator to ensure proper backseating of the valve without any damage thereto.

It is another object to provide a means of the type described which utilizes a coupling device between the valve actuator rod and the valve stem.

It is a further object to provide a coupling of the type described which will protect the valve if a hydraulic-gas actuator is employed and a system malfunction occurs which would apply an excessive force to the valve stem.

It is still another object to provide a coupling of the type described which would facilitate improved control of an electrical motor operator for full, automatic operation during opening of the valve.

It is yet a further object to provide a coupling of the type described which would enable a simple backseating feature to be employed on valves which are operated by a hydraulic actuator.

It is yet another object to provide a coupling of the type described which includes adjusting means associated with the coupling to establish and maintain a proper setting on the coupling throughout valve operation.

These and other objects of the invention are provided by the preferred embodiment thereof in the form of a coupling between a valve stem of a valve and a rod of a valve actuator which stem and rod are aligned on a common axis. The coupling includes a first fitting mounted on an end of one of the stem and rod and the second fitting mounted on an end of the other of the stem and rod. The first and the second fittings respectively have aligned first surfaces thereon which are generally perpendicular to the axis. The first surfaces make contact during movement of the rod in a direction toward the valve for closure of the valve. A biasing means is disposed between the first and second fittings and is capable of limited resilient deflection while maintaining an axial distance between the stem and the rod within a predetermined limit during movement of the rod in a direction away from the valve for opening the valve.

BRIEF DESCRIPTION OF THE DRAWINGS

FIG. 2 is a fragmentary, sectional side view of the coupling of FIG. 1 when the valve is in an intermediate position.

FIG. 3 is a fragmentary, sectional side view of the coupling of FIG. 1 as it may appear when a large force is being applied to initiate opening of the valve.

FIG. 4 is a sectional side view of an alternative coupling including various features of the invention.

DETAILED DESCRIPTION OF THE PREFERRED EMBODIMENTS

Figure 1:
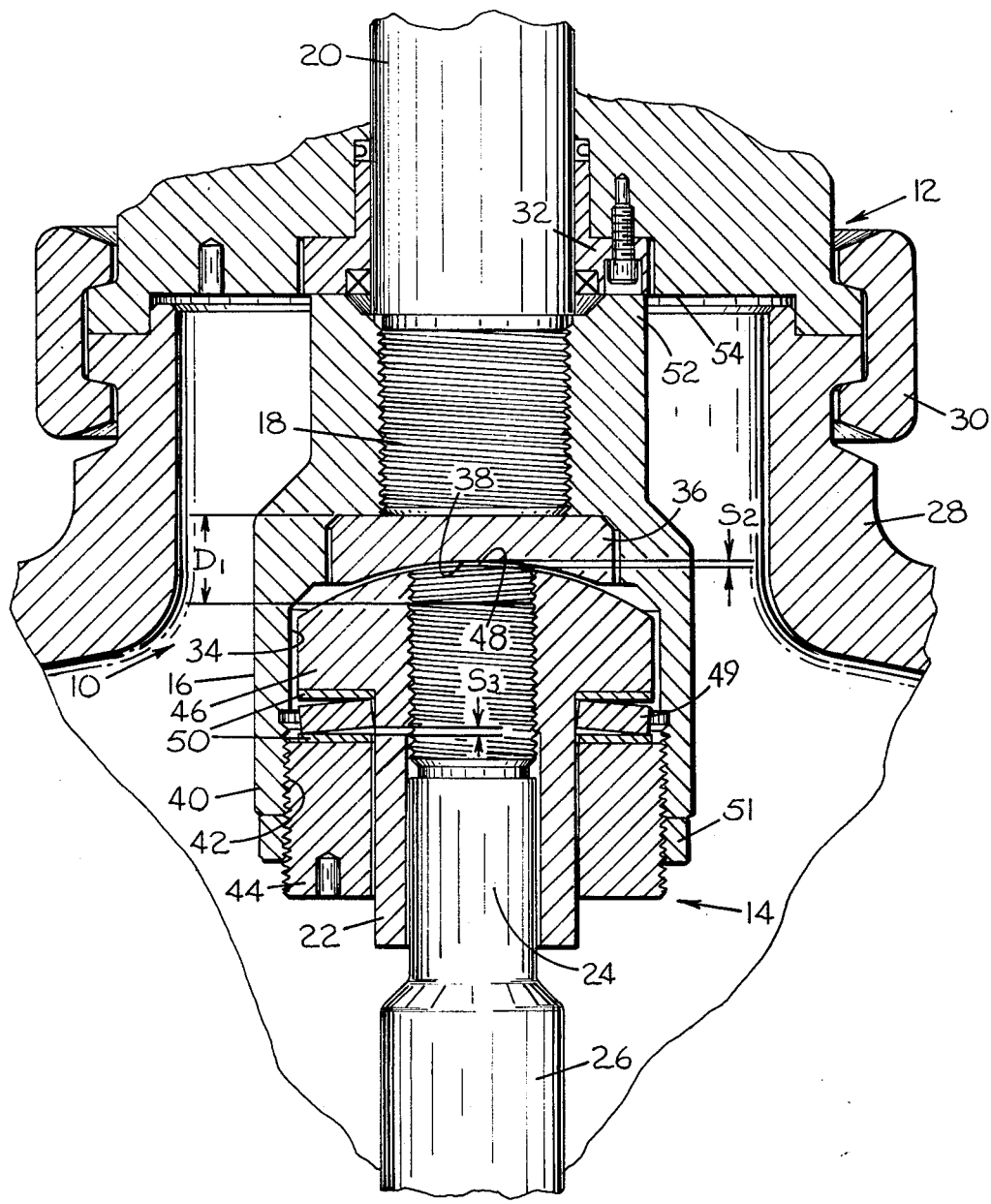
FIG. 1 is a sectional side view of the preferred valve-actuator coupling including various features of the invention in a position for backseating the valve.

As seen in FIG. 1, a preferred coupling 10 is located between a valve actuator 12 and a valve 14 of a type found in nuclear power plants. The coupling 10 includes a first fitting 16 mounted on an end 18 of the rod 20 of the actuator 12. A second fitting 22 of the coupling 10 is mounted on an end 24 of the stem 26 of the valve 14.

The actuator 12 is rigidly mounted to an upper portion 28 of the valve 14 by a conventional yoke lock ring 30 which is well known in the art. The actuator 12 is shown in FIG. 1 to include a sealing device 32 which encircles the rod 20. The actuator 12 is of the hydraulic cylinder-gas accumulator type, although, as will be understood by the description provided hereinbelow, it could just as appropriately be the hydraulic actuator type and would still be within the scope of the invention.

The first fitting 16 of the coupling 10 includes a large cavity 34 aligned with the stem 26 for receipt therein of the second fitting 22. A floating element 36 is located within the cavity 34 adjacent the end 18 of the rod 20 and includes a lower curved surface 38 which is concave. A lower portion 40 of the first fitting 16 includes internal threads 42 for receipt of a threaded collar member 44 of the first fitting 16 for the purpose of loosely entrapping the second fitting 22 within the cavity 34.

The second fitting 22, therefore, includes an enlarged portion 46 which is adapted to be received within the cavity 34 in general alignment with the floating element 36. The upper curved surface 48 of the enlarged portion 46 is convex for mating alignment with the surface 38 of the floating element 36. The enlarged portion 46, and thus the second fitting 22, is retained within the first fitting 16 by the installation of the collar 44.

It can be seen by the description provided hereinabove that downward movement of the actuator rod 20 for closing the valve 14 will cause the surface 38 of the floating element 36 to make contact with the surface 48 of the enlarged portion 46 to lower the stem 26 of the valve. Also, upward movement of the rod 20 can be expected to cause upward movement of the stem 26 since the enlarged portion 46 of the second fitting 22 is generally entrapped within the cavity 34 of the first fitting 16. If the arrangement of the elements as described were altered by further insertion of the collar 44 into the cavity 34 until direct contact is made with the enlarged portion 46 to tightly entrap it within the cavity 34, the resulting, rigid coupling of the rod to the stem would be similar to methods previously employed in the prior art.

However, the coupling 10 further includes a biasing means which is preferably in the form of a Belleville spring 49 although other types of springs could be employed to satisfy the objectives of the invention. The Belleville spring 49 is mounted about the second fitting 22 to be disposed between the collar 44 of the first fitting 16 and the enlarged portion 46 of the second fitting 22. A washer shaped bearing member 50 has been respectively installed on the enlarged portion 46 and the collar 44 to provide low friction contact with the spring 49 to facilitate its proper operation. With the spring 49 thus installed, upward movement of the rod 20 is capable of resiliently deflecting the spring 49 as it in turn transmits forces to the second fitting 22.

The method by which the biasing means satisfies the objectives of the invention can best be demonstrated by an explanation of the manner in which the fitting 10 is installed and adjusted. As seen in FIG. 2, the actuator rod 20 is at an intermediate location with the valve between an opened and a closed position. The collar 44 has been threaded into the cavity 34 to properly locate the spring 49 with respect to the first fitting 16 and the second fitting 22. Specifically, with a minimum of outside forces acting on the rod 20 and the stem 26, the surfaces 38 and 44 are brought into contact by properly adjusting the collar 44. The collar 48 is positioned to slightly deflect the spring 49 between the bearing members 50. The deflection may range from, for example, 0 to 10 percent deflection, the amount being simply that which will tend to create sufficient force between the fittings to generally maintain surfaces 38 and 48 together when a minimum degree of outside force is acting on the stem 26 and the rod 20. It is the purpose of this adjustment to provide minimum biasing to prevent free movement of the enlarged portion 46 within the cavity 34. When the collar 44 is properly adjusted as described hereinabove, a locking nut 51 associated therewith is tightened against the lower end 40 of the first fitting 16 to prevent accidental rotation of the collar 44.

To finally and most critically adjust coupling 10 for proper valve backseating, as seen in FIG. 1, a proper axial distance between the rod 20 and the stem 26 must be established. When hydraulic pressure has been applied to the actuator 12 to cause the valve to be fully opened, an upper stop portion 52 on the first fitting 16 is caused to make contact with a lower surface 54 of the actuator 12 for positive location of the rod 20. To ensure a proper pressure is simultaneously being applied to the backseat of the valve 14, the relative insertion of the end 24 of the stem 26 is established by the degree to which it is threaded therein. When properly set, the spring 49 will be deflected by resistance against the backseat as the surfaces 38 and 48 are separated. The amount of separation between the surfaces 38 and 48, however, is not sufficient to fully deflect the spring 49. When the spring 49 is deflected as shown, it applies a biasing force to the second fitting 22 which ensures proper backseating of the valve but is well within an amount which could cause damage to the valve. Accordingly, it is desirable to properly set coupling 10 in such a manner that the biasing of spring 49 will be applied to stem 26 whenever the actuator 12 is in a position to have opened the valve 14, thus ensuring that the forces acting on the rod 20 will not be directly transmitted to the valve.

As mentioned hereinabove, it is expected that during the operation of the actuator 12, a larger force than is desirable for application to the backseat may be required simply to initiate opening of the valve from the closed position. As seen in FIG. 3, the actuator rod 20 would move upwardly away from the valve while the stem 26 remains in the closed position. It is expected that a sufficient force will be generated between the first fitting 16 and the second fitting 22 to cause the spring 49 to be fully deflected. When the spring 49 is deflected as shown in FIG. 3, actuator force acting on the rod 20 will be directly applied to the stem 26 causing the valve to be opened. When resistance on the stem 26 is relieved by the valve being partially opened, the relative position of the second fitting 22 with respect to the first fitting 16 may assume a position generally shown in FIG. 2 and FIG. 1 where deflection of the spring 49 is less than maximum.

It is significant with regard to the manner in which the fitting 10 is adjusted that the axial distance D-1 (FIG. 1) between the rod 20 and the stem 26 is greater than the axial distance D-2 (FIG. 2) and less than the axial distance D-3 (FIG. 3). When the axial distance D-1 in the closed position is between the distances D-2 and D-3, full actuator force on the rod 20 cannot be applied to the valve during backseating and some biasing force created by deflection of the spring 49 will be applied during backseating to prevent valve leakage.

For an improved understanding of the invention, various parameters of a typical installation can be provided to simply serve as an example without limiting the invention thereby. The valve with which the embodiment of FIGS. 1, 2 and 3 is associated is a 32-inch, balanced globe valve of the type used in nuclear power plants. The stem has a diameter of about 2½ inches, while the inside diameter of the spring 49 is about 2¾ inches. As seen in FIG. 2, the spring 49 is capable of deflecting through a distance S-1 of about ⅛ inches to generate a force ranging from a nominal level as described hereinabove to about 16,000 pounds when fully depressed, as seen in FIG. 3. When the actuator is positioned to close the valve, as seen in FIG. 1, the distance S-2 between the surfaces 38 and 48 is about 1/16 of an inch and the potential remaining distance S-3 through which the spring 49 could be deflected is also about 1/16 of an inch. In this position, the spring 49 is found to apply about 10,000 pounds of force to the valve 14 to ensure proper backseating of the valve without damage thereto.

As seen in FIG. 4, an alternative coupling 70 has been particularly adapted for use with an electric motor operated actuator 72. The actuator 72, its associated threaded rod 74 and a valve stem 76 are shown in an open position for proper backseating of the valve. The coupling 70 again includes a first fitting 78 and a second fitting 80. However, in the configuration of this embodiment, the fittings are generally reversed so that the first fitting 78 is mounted on the stem 76 and the second fitting 80 is mounted to the rod 74. Additionally, a number of other changes have been made which will, nevertheless, be apparent from the figure as satisfying the objectives of the invention.

Coupling 70 again includes a pair of opposed surfaces 82 and 84 which will make contact during closing of the valve. A biasing member, in the form of a pair of Belleville springs 86 which are in series, is again provided between the first fitting 78 and the second fitting 80. The adjustments discussed hereinabove as desirable for a coupling of the present invention can be made for coupling 70 but through different means than those previously described. For example, to initially ensure some deflection of the springs 86, a cap portion 88 of the first fitting 78 is threaded onto a base portion 90 of the first fitting 78 with the second fitting 80 and springs 86 entrapped therebetween. A viewing opening 92 is provided through the cap 88 to observe initial deflection of the springs 86.

However, to ensure proper deflection when the motor operated actuator 72 has positioned the rod 74 for opening of the valve, an additional element has been provided. A sleeve member 94 is mounted on the rod 74 and is pinned thereto by a pin 96 and associated lever 98. The end of lever 98 is disposed with a vertical slot 100 in the upper structure 102 of the valve to allow vertical movement of the rod 74 and sleeve 94 without any rotation thereof. It is desirable through this means, which is well known in the valve art, to ensure that the rod 74 will be limited to axial movement during rotation of the motor operated actuator 72.

To properly establish the distance between the rod 74 and the valve stem 76 for proper backseating, an adjustable collar 104 is mounted on the threaded exterior 106 of the sleeve 94. The adjustable collar 104 may be rotated with, for example, a spanner wrench to make contact with a lower surface 108 of the actuator 72 at the desired axial position of the rod 74 which ensures some deflection of the springs 86 which will cause them to generate a proper biasing force for backseating. When the adjusting collar 104 makes contact with the lower surface 108 of the actuator 72, a torque limit switch (not shown) can be employed to turn off the electric motor of actuator 72. The amount of torque at which this switch will operate can be higher than the torque that may be required to initiate opening of the valve from the closed position since the coupling 70 will prevent this torque from being applied to the valve through the stem 76 at the backseated position.

The coupling 70 includes other features which could be readily employed in other embodiments while, nevertheless, being within the scope of the invention as claimed. For example, it can be seen that the springs 86, being in series, double the range of deflection without significantly changing the biasing force to facilitate easier adjustment of the coupling 70. Additionally, there is provided an internal stop element 110 on the second fitting 80 to prevent full deflection of the springs 86 if there are indications that repeated, full deflection of the springs would alter their characteristic resilience. Further, although the embodiment of FIGS. 1, 2 and 3 might be more appropriately employed with an electric motor type actuator, an adjusting means can be provided to properly establish the desired distance between the rod 74 and stem 76 in the closed position even though the second fitting is completely encased within the first fitting.

It should be apparent to those skilled in the art that additional changes might be made to the embodiments described hereinabove without departing from the scope of the invention as claimed.

What is claimed is:

1. A coupling device for a valve stem and an actuator rod operably extending from a valve actuator, said stem and said rod being aligned on a common axis, said stem being capable of axial movement toward and away from said actuator while maintaining at least a predetermined minimum distance therebetween, said coupling device comprising:

a first fitting being axially adjustably mounted on an end of one of said stem and said rod and including a cavity therein;

a second fitting being axially adjustably mounted on an end of the other of said stem and said rod and including an enlarged portion adapted to be loosely fitted within said cavity allowing some axial movement of said enlarged portion with respect to said first fitting;

said first and said second fittings respectively having aligned first surfaces thereon which are generally perpendicular to said axis, said first surfaces making contact during movement of said rod in a direction away from said actuator;

spring means disposed within said cavity of said first fitting between said first fitting and said second fitting and capable of limited resilient deflection while exerting a force on said first and said second fittings in a direction tending to decrease an axial distance between said stem and said rod until said first surfaces make contact;

said first and said second fitting having aligned second surfaces thereon which are capable of making contact to maintain said axial distance between said stem and said rod within a predetermined limit during movement of said rod in a direction toward said actuator and to prevent said spring means from being fully deflected;

locating means mounted on said rod and adapted to make contact with said actuator for maintaining said end of said rod at least a desired distance from said actuator, said locating means being capable of preselected axial positioning on said rod to establish said desired distance for maintaining said axial distance between said stem and said rod less than said predetermined limit when said stem and said rod are positioned toward said actuator; and said first fitting having an opening therein to allow viewing of said cavity and said spring means to facilitate some deflection of said spring means when establishing said desired distance of said end of said rod from said actuator by axial adjustment of said first fitting, said second fitting and said locating means.

* * * * *